United States Patent [19]

Samejima

[11] 4,032,593

[45] June 28, 1977

[54] CURABLE RESIN COMPOSITIONS

[75] Inventor: Hiroshi Samejima, Ibaragi, Japan

[73] Assignee: Mitsubishi Petrochemical Co., Ltd., Tokyo, Japan

[22] Filed: July 11, 1975

[21] Appl. No.: 595,304

[30] Foreign Application Priority Data

July 12, 1974 Japan .............................. 49-79862
May 6, 1975 Japan .............................. 50-53156

[52] U.S. Cl. .......................... 260/835; 260/18 PN; 260/830 R; 260/830 S; 260/830 TW; 260/836; 260/837 R; 260/860; 260/861

[51] Int. Cl.² ........................................ C08L 63/00

[58] Field of Search .................................... 260/835

[56] References Cited

UNITED STATES PATENTS

| | | | |
|---|---|---|---|
| 3,723,568 | 3/1973 | Hoeschele | 260/830 R |
| 3,723,569 | 3/1973 | Hoeschele | 260/830 R |
| 3,957,905 | 5/1976 | Sumoto | 260/835 |

*Primary Examiner*—Paul Lieberman
*Attorney, Agent, or Firm*—Wenderoth, Lind & Ponack

[57] ABSTRACT

A curable resin composition which can give cured products of superior impact resistance, superior flexibility, thermal shock resistance, storage stability and adhesiveness, and which comprises A. either (1) a polyepoxide compound containing at least two 1,2-epoxy groups per molecule or (2) an unsaturated polyester having a molecular weight of 500 to 5,000.

B. a specified aromatic copolyester having a weight average molecular weight of 10,000 to 100,000 and C. either (1) a curing agent for the polyepoxide compound (A-1) or (2) an ethylenic monomer copolymerizable with the unsaturated polyester (A-2).

9 Claims, 4 Drawing Figures

PHOTO.1
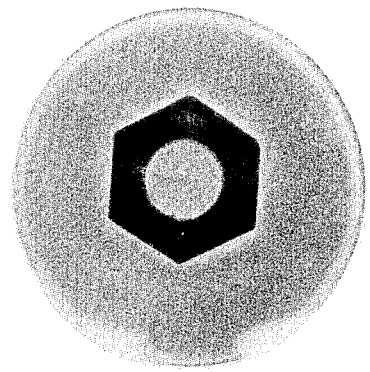
PHOTO.2
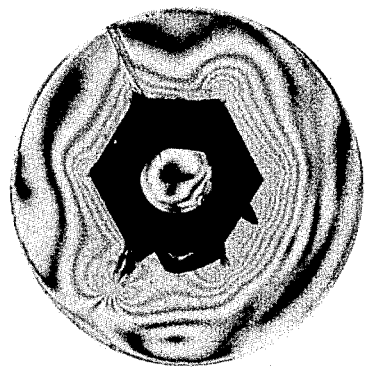
PHOTO.3
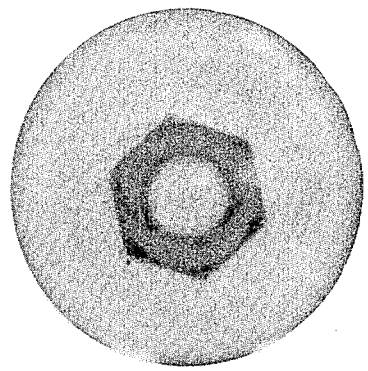
PHOTO.4
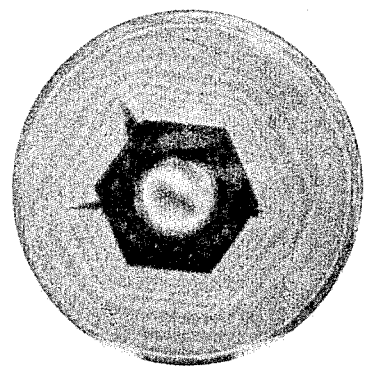

CURABLE RESIN COMPOSITIONS

This invention relates to a curable resin composition, and more specifically, to a curable resin composition comprising as main constituents a relatively small amount of a specific aromatic copolyester, a polyepoxide compound or an unsaturated polyester resin, and a curing agent of the polyepoxide compound or an ethylenic monomer polymerizable with the unsaturated polyester.

Because of their superior mechanical and electrical properties, epoxy resins have found a wide range of applications in various fields such as coating, lamination, adhesion, casting, potting or encapsulation. The epoxy resins, however, have the defect that when sufficiently cured to products having the desired high heat distortion temperatures, they tend to become brittle. Various attempts have been mmade to remove this defect. One type of such attempts involves mixing a flexibilizer and a plasticizer, such as an aliphatic polyester or a diglycidyl ester of a linoleic dimer acid, with epoxy resins so as to form a homogenous phase (see, for example, U.S. Pat. Nos. 2,830,031, 2,947,717, and 2,915,485). Another type involves incorporating particles of an elastomer such as a liquid rubber in epoxy resins (see, for example, Japanese Laid-Open Patent Publications Nos. 69,897/73 and 43,100/72).

The first method can impart toughness to the epoxy resins, but cannot avoid the attendant reduction in modulus and heat distortion temperature. For example, a method has already been known to mix an aliphatic polyester with an epoxy resin so as to toughen the epoxy resin. Addition of the aliphatic polyester may impart flexibility to the cured product, but also involves a marked decrease in its heat distortion temperature. According to the second method, superior toughness can be imparted without lowering the impact strength and heat distortion temperature of the epoxy resin. However, since elastomers generally have poor compatibilty with, and dispersibility in, epoxy resins, this method also suffers from the defect that expensive elastomers of special types must be used. Furthermore, the second method has the disadvantage that the unsaturated bond of the elastomer may become a cause of the coloration of the cured product and also the reduction of its oxidation resistance. Moreover, since the curing reaction of the epoxy resin involves cross-linking reaction, strict conditions are required for curing from the standpoint of quality control.

Methods have also been proposed previously in which a rubbery substance such as a styrene/butadiene copolymer, or a styrene/butadiene/styrene block copolymer is added to an unsaturated polyester resin in order to improve the flexibility and impact strength of cured products of the unsaturated polyester resin composition (see, for example, Japanese Laid-Open Patent Publication No. 30,480/74, U.S. Pat. No. 32,793,400, and German OLS 2,061,152). However, according to such a method, the heat distortion temperature of a cured product of the unsaturated polyester resin is lowered, and its thermal shock resistance cannot be improved.

It is an object of this invention to provide an epoxy resin composition or unsaturated polyester resin composition which gives a cured product having superior impact resistance, superior flexibility and strong resistance to abrupt thermal change (to be referred to as "shock resistance").

Another object of this invention is to provide an epoxy resin composition or unsaturated polyester resin composition which can give a cured product having the above-mentioned superior physical properties, and which has high storage stability.

Still another object of this invention is to provide an epoxy resin composition which can give a cured product having superior adhesion to various materials such as metals, galss, ceramics, and wood.

Other objects and advantages of this invention will become apparent from the following description.

These objects and advantages can be achieved in accordance with this invention by a curable resin composition comprising as main constituents A. either (1) polyepoxide compound containing at least two 1,2-epoxy groups per molecule or (2) an unsaturated polyester having a molecular weight of 500 to 5,000, B. an aromatic copolyester having a weight average molecular weight of 10,000 to 100,000 and composed of recurring units of formula (I) and recurring units of formula (II)

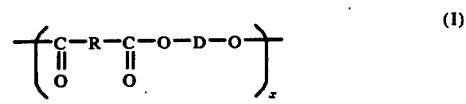

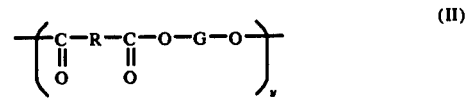

wherein R is a residue resulting from the removal of carboxyl groups from an aromatic dicarboxylic acid; D is a residue resulting from the removal of hydroxyl groups from a glycol containing 2 to 15 carbon atoms; G is a residue resulting from the removal of the terminal hydroxyl groups from a long-chain poly(alkylene oxide) glycol having a number average molecular weight of 350 to 6,000, and $x/x + y$ is from 0.2 to 0.8 and C. either (1) a curing agent for the polyepoxide compound (A-1) or an ethylenic monomer polymerizable with the unsaturated polyester (A-2).

The present invention will be described in greater details hereinbelow.

[I] AROMATIC COPOLYESTERS

The present invention, as described above, embraces both curable epoxy resin composition and curable unsaturated polyester resin composition. These two compositions are common in that both contain a relatively small amount of aromatic copolyesters.

The aromatic copolyester (B) used in this invention is an aromatic copolyester having a weight average molecular weight of 10,000 to 100,000 and composed of recurring units of formula (I) and recurring units of formula (II)

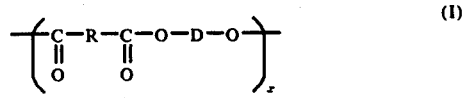

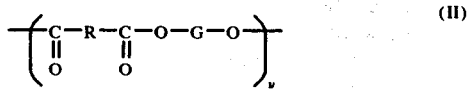

wherein R is a residue resulting from the removal of carboxyl groups from an aromatic dicarboxylic acid; D is a residue resulting from the removal of hydroxyl groups from a glycol containing 2 to 15 carbon atoms; G is a residue resulting from the removal of the terminal hydroxyl group from a long-chain poly(alkylene oxide) glycol having a number average molecular weight of 350 to 6,000; and $x/x + y$ is from 0.2 to 0.8.

This aromatic copolyester can be prepared by copolycondensing (1) at least one of aromatic dicarboxylic acids or their functional derivatives, (2) at least one short-chain glycol selected glycols containing 2 to 15 carbon atoms and their functional derivatives, and (3) at least one long-chain poly(alkylene oxide) glycol having a number average molecular weight of 350 to 6,000 under the conventional reaction conditions so that $x/x + y$ in the formulae (1) and (II) above becomes 0.2 to 0.8. These aromatic copolyesters and processes for their preparation are disclosed in deatil in U.S. Pat. Nos. 3,023,192 and 3,766,146 and Belgian Pat. No. 779,683.

Examples of the aromatic dicarboxylic acids are terphthalic acid, isophthalic acid, naphthalene-2,6-dicarboxylic acid, diphenyldicarboxylic acid, and derivatives of these acids (for example, having a substituent such as an alkyl group of 1 to 10 carbon atoms, an alkoxy group or an aryl group, or a halogen atom) The residue (R) in the above-given formulae (I) and (II) results from the removal of carboxyl groups from these aromatic dibasic carboxylic acids.

Terephthalic acid is especially preferred among these aromatic dicarboxylic acids. Advantageously, these aromatic dicarboxylic acids are used so that at least 70%, escpecially at least 80%, of the total number of R residues contained in the recurring units of formulae (I) and (II) are para-phenylene groups.

Example of the short-chain (low-molecular-weight) diols of formula (I) are those containing 2 to 15 carbon atoms, such as ethylene glycol, diethylene glycol, propylene glycol, tetramethylene glycol, neopentyl glycol, isobutylene glycol, dihydroxycyclohexane and cyclohexanedimethanol. The residue (D) in the above formulae (I) and (III) result from the removal of hydroxyl groups from these diols. Of these shortchain glycols, the above exemplified glycols containing 2 to 8 carbon atoms are preferred, and tetramethylene glycol and ethylene glycol are especially preferred species.

These short-chain glycols can be used either along or in admixture to form the aromatic copolyester (B).

Examples of the long-chain poly(alkylene oxide) glycols constituting the residue (G) in the formula (II) above are poly(alkylene oxide) glycols with the alkylene group containing 2 to 9 carbon atoms which have a number average molecular weight of 350 to 6,000, such as poly (ethylene ether) glycol, poly(1,2-propylene ether) glycol, poly(1,3-propylene ether) glycol, and poly(tetramethylene ether) glycol. The residue (G) in the formula (II) results from the removal of hydroxyl groups from these poly(alkylene oxide) glycols, Especially preferred long-chain poly(alkylene oxide) glycols are those having a number average molecular weight of 800 to 5,000.

The aromatic copolyester (B) used in this invention contains esters of formulae (I) and (II) as main ester units. They may further contain minor amounts of other ester units. For example, in the preparation of these copolyesters, not more than 5 mol % of the aromatic dicarboxylic acid component can be replaced by an aliphatic dicarboxylic acid such as adipic acid, azelaic acid, sebacic acid or dodecanedicarboxylic acid. Copolyesters obtained in this case contain a minor amount of an ester unit based on the minor acid component used. These copolyesters can also be used as component (B) of the resin composition of this invention.

Especially preferred aromatic copolyesters used in this invention are those in which $x$ and $y$ in formulae (I) and (II) have the following relation $$x/x + y = 0.35-0.70.$$

The copolyesters used in this invention should have a weight average molecular weight of 10,000 to 100,000, preferably 20,000 to 100,000. If the molecular weight exceeds this limits, the compatibility of these copolyesters with the polyepoxide compounds or unsaturated polyester resins and their workability such as viscosity characteristics are reduced. On the other hand, if the molecular weight is less than the lower limit of this range, the heat distortion temperature and impact resistance of cured products of the polyepoxide compounds or cured products of the unsaturated polyester resins are lowered.

[II] CURABLE EPOXY RESIN COMPOSITION

II-1. As previously stated, the curable epoxy resin composition of this invention comprises as main constituents A-1. the polyepoxide compound,
B. the aromatic copolyester, and
the curing agent for polyepoxide compound.

Preferred curable epoxy resin compositions of this invention contain as main constituents A-1. a polyepoxide compound containing at least two 1,2-epoxy groups per molecule,
B. 1 to 10 percent weight, based on the polyepoxide compound, of an aromatic copolyester having a weight average molecular weight of 10,000 to 100,000 and composed of recurring units of formula (I) and recurring units of formula (II)

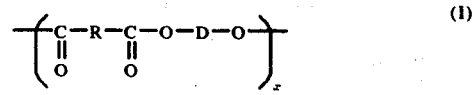

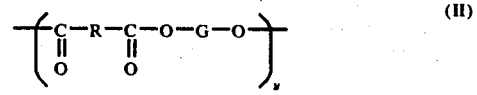

wherein R is a residue resulting from the removal of carboxyl groups from an aromatic dicarboxylic acid; D is a residue resulting from the removal of hydroxyl groups from a glycol containing 2 to 15 carbon atoms; G is a residue resulting from the removal of the terminal hydroxyl groups from a long-chain poly(alkylene oxide) glycol having a number average molecular weight of 350 to 6,000; and $x$ and $y$ have the follwoing relation $x/x + y = 0.2–0.8$,
and C-1. a curing agent fom the above polyepoxide compound.

The aromatic copolyesters as component (B) of the curable epoxy resin composition of this invention have already been described hereinabove. Accordingly, this section will deal with the description of the other components.

II-2. Polyepoxide compound

The polyepoxide compound as one constituent of the epoxy resin composition of this invention may be any polyepoxide compounds which contain at least two 1,2-epoxy groups per molecule. These polyepoxide compounds have been described in various literature references, such as H. Lee and K. Neville, "Handbook of Epoxy Resint", McGraw-Hill Book Co, Inc., New York, 1967, and domestic and foreign patent literature, and have already been sold under various trademarks. In the present invention, any polyepoxide compounds including those already known can be used.

Typical examples of the polyepoxide compounds are:
1-a. polyepoxy ethers containing at least two epoxy groups per molecule,
1-b. polyepoxy esters containing at least two epoxy groups per molecule, and
1-c. polyepoxide compounds contaning at least two epoxy groups per molecule, prepared by epoxidizing compounds containing at least two unsaturated bonds.

Specific examples of the polyepoxy ethers (1-a) above include a diglycidyl ether of bisphenol A, polyglycidyl ethers of polyhydric phenols such as polyphenols derived from phenol or cresol and aldehydes (novolacs), and polyglycidyl ethers of alcohols such as ethylene glycol, tetramethylene glycol or glycerol.

Example of the polyepoxyesters (1-b) are polyglycidyl esters of polycarboxylic acids such as adipic acid, phthalic acid, tetrahydrophthalic acid or hexahydrophthalic acid.

Examples of the polyepoxide compounds (1-c) are 3-(3,4-epoxy-cyclohexane)-8,9-epoxy-dioxaspiro[3,5]-undecane, bis(2,3-epoxycyclopentyl ether, and epoxidized butadiene.

II-3. Curing agent

Examples of curing agents (C-1) for the polyepoxide compounds are:
2-a. polycarboxylic acids containing at least two carboxyl groups per molecule,
2-b. carboxylic anhydrides containing at least one carboxylic anhydride group per molecule,
2-c. polyamines containing at least one primary, secondary or tertiary amino group per molecule,
2-d. polythiols containing at least two thiol (-SH) groups per molecule, and
2-e. polyamide resins.

Specific examples of the polycarboxylic acids (2-a) include trimellitic acid, pyromellitic acid, phthalic acid, hexahydrophthalic acid, and azelaic acid.

Examples of the carboxylic anhydrides of formula (2-b) include maleic anhydride, phthalic anhydride, "nadic" anhydride (bicyclo[2.2.1]heptene-2,3-dicarboxylic anhydride), "nadic" methyl anhydride (methylbicyclo[2.2.1]heptene-2,3-dicarboxylic anhydride), pyromellitic anhydride, trimellitic anhydride benzophenonetetracarboxylic dianhydride, and polyazelaic polyanhydride.

Specific examples of the polyamines (2-c) include primary, secondary and tertiary amines, such as tetramethylene diamine, triethylene tetramine, β-aminoethyl piperazine, 1,3-diaminocyclohexane, m-phenylene diamine, 4,4'-diaminodiphenylmethane, 4,4'-diaminodiphenyl sulfone, 2,4-bis(4-aminobenzyl) aniline, 2-ethylimidazole, dicyandiamide, and triaminosilane.

Specific examples of the polythiols are liquid polysulfides disclosed, for example in U.S. Pat. No. 3,278,496.

Examples of the polyamide resins (2-e) are condensation products formed between linoleic dimer acids and polyamines such as ethylene diamine or diethylene triamine (see, for example, U.S. Pat. Nos. 2,379,413 and 2,482,761.

The curing agents that can be used in this invention, however, are not limited to the above-exemplified compounds.

II-4. Promotors

If desired, promotors are further incorporated in the curable epoxy resin compositions of this invention to promote a curing reaction.

Examples of the promotors are:
3-a. secondary and tertiary aliphatic amines,
3-b. metal salts of organic acids,
3-c. metal halides, and
3-d. Lewis acids and complexes thereof.

Specific examples of the amines (3-a) are N-methyl piperazine, N,N-dimethylbenzylamine, N-ethylmorpholine, and triethylene diamine. The metal salts of organic acids (3-b) include, for example, calcium stearate, zinc naphthenate, stannous octanoate, and lead naphthenate. Examples of the metal halides (3) are zinc chloride, stannic chloride, lithium chloride, and sodium iodide. Examples of the Lewis acids and complexes thereof (3-d) are boron trifluoride, boron trifluoride/monethanolamine, and borbon trifluoride/ether.

II-5. Preferred curable epoxy resin compositions of this invention contrain 1 to 10% by weight, especially 3 to 8% by weight, based on the polyepoxide compounds, of the aromatic copolyesters. If the proportion is outside the above ranges, no sufficient effect of blending the aromatic copolyester is obtained, or the various properties of epoxy resins are impaired.

In addition to the three components described above, the curable epoxy resin compositions of this invention can, if desired, contan other additives, for example, a reactive or non-reactive diluent such as glycidyl methacrylate, phenyl glycidyl ether, glycidyl linolenate, butyl glycidyl ether, propylene glycol diglycidyl ether, dibutyl terephthalate, or nonylphenol, an inorganic filler such as silica, alumina, diatomaceous earth, kaolin or titanium dioxide, and a pigment such as various metal oxides or organic pigments.

A typical embodiment of preparing the curable epoxy resin composition of this invention comprises mixing the polyepoxide compound with the aromatic copolyester, stirring the mixture at a temperature of 50° to 200° C., and cooling the mixture to room temperature. At this stage, a transparent homogeneous phase or a non-transparent microdispersed phase is formed according to the proportions of the polyepoxide compound and the aromatic copolyester, or the type of the aromatic copolyester. The epoxy equivalent of such a composition and the results of a long-term test of observing it by an optical microscope, show that the composition at this stage is very stable, and can be stored for about 1 year in such a state that it can be readily put to use.

Prior to using the curable epoxy resin composition, preferably immediately before it, the curing agent and if desired, the promotor are added to the composition to form the curable epoxy resin composition of this invention. Advantageously, the proportion of the curing agent is such that it is 0.2 to 1.3 equivalents, preferably 0.5 to 1.1 equivalents, per epoxy equivalent of the polyepoxide compound in the composition. The resulting curable epoxy resin composition, if desired, is defoamed or subjected to some other treatment before it is actually put to use.

In order to cure the curable epoxy resin composition of this invention, it is generally left to stand at 0° to 200° C. for several seconds to nearly 100 hours although the conditions may vary according to the type of the curing agent, the presence of the promotor, or the type and amount of the promotor.

The curable epoxy resin compositions of this invention can be used in the same applications as in the case of epoxy resins in general, such as coating, lamination, adhesion, or casting. Cured products of these curable compositions are transparent of opaque and tough. The curable epoxy resin compositions of this invention also give cured product which adhere firmly to the surface of other materials.

[III] CURABLE UNSATURATED POLYESTER RESIN COMPOSITION

III-1. The curable unsaturated polyester resin composition of this invention, as stated previously, comprises as main constituents A-z. an unsaturated polyester having a molecular weight of 500 to 5,000, B. the aromatic copolyester, and C-z. the ethylenic monomer polymerizable with the unsaturated polyester A-z.

Preferred curable unsaturated polyester resin compositions of this invention comprises as main constituents A-z. an unsaturated polyester having a molecular weight of 500 to 5,000.

B. an aromatic copolyester having a weight average molecular weight of 10,000 to 100,000 and recurring units of formula (I) and recurring units of formula (II)

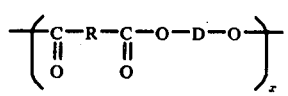 (I)

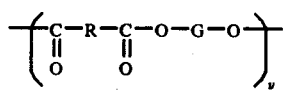 (II)

wherein R is a residue resulting from the removal of carboxyl groups from an aromatic dicarboxylic acid; D is a residue resulting from the removal of hydroxyl groups from a glycol containing 2 to 15 carbon atoms; G is a residue resulting from the removal of the terminal hydroxyl groups from a long-chain poly(alkylene oxide) glycol having a number average molecular weight of 350 to 6,000; and x and y have the following relation $x/x + y = 0.2 - 0.8$, and C-2. an ethylenic monomer polymerizable with the unsaturated polyester (A-2).

The aromatic copolyester as one component of the curable unsaturated polyester resin composition has already been described in detail hereinabove. Accordingly, this section will deal with the description of the other components.

III-2. Unsaturated Polyester

The unsaturated polyesters (A-2) used in this invention have a molecular weight of 500 to 5,000, preferably 1,000 to 3,000.

These unsaturated polyesters can be obtained by esterifying unsaturated dicarboxylic acids or their functional derivatives with polyhydric alcohols with or without saturated dicarboxylic acids. Examples of the unsaturated dicarboxylic acids and $\alpha,\beta$-unsaturated dicarboxylic acids such as fumaric acid, maleic acid, maleic anhydride, itaconic acid, mesaconic acid, and citraconic acid. The functional derivatives of these dicarboxylic acids are lower dialkyl esters or dihalides of these dicarboxylic acids. Examples of the saturated dicarboxylic acids are terephthalic acid, ortho-phthalic acid, isophthalic acid, sebacic acid, adipic acid, succinic acid, and chlorendic acid (Het Acid). The polyhydric alcohols include, for example, ethylene glycol, 1,2-propylene glycol, 1,3-butylene glycol, 1,4-butanediol, diethylene glycol, dipropylene glycol, neopentyl glycol, hexylene glycol, hydrogenated bisphenol A, and 2,2'-di(4-hydroxy-propoxyphenyl)propane. As required, other polyhydric alcohols than glycols, such as trihydric alcohols, may be used in small amounts.

Methods for preparing unsaturated polyesters using the above components have already been known well and a detailed description of them is found, for example, in U.S. Pat. No. 2,195,362, and Industrial and Engineering Chemistry, Vol. 51, page 253 et seq., 1959.

III-3. Ethylenic monomer polymerizable with the unsaturated polyester

As another component of the curable unsaturated polyester resin composition of this invention, the ethylenic monomer (c-2) polymerizable with the unsaturated polyester is used. Examples of the ethylenic monomer are styrene, chlorostyrene, lower alkyl esters of arcrylic acid, lower alkyl esters of methacrylic acid, vinyl toluene, divinyl benzene, diallyl phthalate, and diallyl fumarate. Of these, styrene and an ethylenic monomer mixture containing at least 70 mole % of styrene are especially preferred.

III-4. Preferred species of the curable unsaturated polyester resin compositions of this invention are those which contain the aromatic copolyester (B) in an amount of 1 to 35 parts by weight, preferably 2.5 to 10 parts by weight, per 100 parts by weight of the total amount of the unsaturated polyester (A-2) and the ethylenic monomer (C-2). When the proportion of the aromatic copolyester is less than 1 part by weight, the impact resistance of cured products of the composition cannot be increased. On the other hand, if the proportion exceeds 35 parts by weight, the rate of curing markedly decreases, and moreover, the mechanical strength and smoothness of cured products of the composition are deteriorated.

Curable compositions containing 80 to 30 parts by weight of the unsaturated polyester (A-2) and 20 to 70 parts by weight of the ethylenic monomer (C-2), the total amount of the polyester (A-2) and the monomer (C-2) being 100 parts by weight, can give cured products having superior impact resistance, thermal shock resistance and flexural strength.

III-5. Curing agent (E)

In addition to the unsaturated polyester (A-2), the aromatic copolyester (B) and the ethylenic monomer (C-2), the curable unsaturated polyester composition of this invention preferably contains at least one curing agent (E) selected from the group consisting of organic peroxides, azo compounds and carbonyl compounds.

Examples of the organic peroxides are acetyl peroxide, methyl ethyl ketone peroxide, lauryl peroxide, benzoyl peroxide, t-butyl peroxide, di-t-butyl peroxide, hydroxycyclohexyl peroxide, cumene hydroperoxide, t-butyl peroctate, 2,5-dimethyl-2,5-di(t-butyl peroxy) hexane, and 2,5-dimethylhexyl-2,5-di(peroxybenzoate).

Other suitable curing agents include azo compounds such as $\alpha,\alpha'$-azobis-isobutyronitrile, t-butyl azo-2-cyanopropane, t-butyl azo-2-cyanobutane, t-butyl azo-1-cyanocyclohexane, and azo-($\alpha,\gamma$-dimethyl)-valero-$\alpha$-dinitrile, and carbonyl compounds such as phenyl acetaldehyde, phenylformonitirile, benzyl phenyl ketone, or hydratropaldehyde.

Preferably, the amount of such a curing agent is 0.05 to 5 parts by weight per 100 parts by weight of the total amount of the unsaturated polyester (A-2) and the ethylenic monomer (C-2).

III-6. Promotor

If desired, the curable unsaturated polyester resin composition of this invention can be cured within shorter periods of time and/or at lower temperatures by incorporating a curing promotor (F). Examples of suitable promotors used for this purpose are metal salts of naphthenic acid such as cobalt, manganese or copper naphthenate, metal complexes of $\alpha,\beta$-keto compounds such as vanadium acetylacetonate, cobalt acetylacetonate or copper acetylacetonate, tertiary aliphatic and aromatic amines such as N,N-dimethyl aniline, triethanolamine, pyridine or triethylamine.

The amount of the promotor is 10 to 100% by weight based on the curing agent (E).

The curable unsaturated polyester resin compositions of this invention can be prepared by various procedures. For example, the unsaturated polyester (A-2) is first mixed with the ethylenic monomer (C-2), and then, the aromatic copolyester (B) is added to the mixture. Preferably, however, the following methods are used.

1. A method which comprises mixing the unsaturated polyester with the aromatic copolyester, stirring the mixture at 50° to 300° C., preferably 100° to 250° C., cooling the mixture to room temperature, and then mixing the cooled mixture with the ethylenic monomer.

2. A method which comprises dissolving the unsaturated polyester and the aromatic copolyester at room temperature in a common solvent for these components, heating the solution to remove the solvent, cooling the residue to room temperature, and then, adding the ethylenic monomer to the residue.

In order to use the curable unsaturated polyester resin compositions of this invention as materials for premixes, FRP (fiber-reinforced plastics), SMC (sheet molding compounds), or BMC (bulk molding compounds), a reinforcing agent such as glass fibers and various organic fibers, an inorganic filler such as calcium carbonate, magnesium oxide, aluminum hydroxide, magnesium hydroxide or calcium oxide, a pigment, a slipping agent, or other additives can be incorporated in these compositions.

The curable unsaturated polyester resin compositions of this invention so obtained can be cured by maintaining them usually at about 20° to 200° C., preferably about 25° to 150° C., for about 30 minutes to several days.

Cured products of the unsaturated polyester resin compositions so obtained have improved thermal shock resistance, impact resistance and flexural strength over cured products of the conventional unsaturated polyester compositions. Accordingly, they can give various useful products such as FRP, BMC and SMC having very superior mechanical and physical characteristics.

The following Examples illustrate the present invention more specifically.

EXAMPLE 1

A 0.2-liter flask equipped with a stirrer, a thermometer and a nitrogen introducing inlet was charged with 100 parts of each of the polyepoxy compounds shown in Tables 1 and 2 and a predetermined amount of the aromatic copolyesters B-1 to B-5 shown in Table 3. The mixture was heated at 150° to 160° C. for 3 to 5 hours in a stream of nitrogen. At the end of the heating operation, the mixture formed a slightly yellowish transparent viscous liquid. The properties of this viscous liquid were tested, and the results are shown in Table 1. Table 2 shows detailed compositions of the various polyepoxide compounds used and the name of the suppliers.

Curing agents and curing promotors were incorporated in the proportions indicated in Table 1 in the polyepoxide/copolyester mixtures and Epikote 828 (for comparison). Each of the resulting compositions was heated at 80° C. for 1 hour and then at 120° C. for 5 hours. The properties of the resulting cured products were determined, and the results are shown in Table 1. Furthermore, the stress of each of the cured product in Run 2 and the control was measured by means of a photoelastic meter. The results are shown in the attached photographs 1 (Run No. 2) and 2 (Control).

The various properties shown in these tables were measured by the following methods.

Viscosity

Measured at 30° C. using a BH-type rotary viscometer.

Weight per epoxide equivalent (WPE)

0.2 g of a sample is placed in a 200 ml. flask, and 90 ml. of methyl ethyl ketone is put into it. The mixture is stirred until it becomes completely clear. Then, to the resulting mixture are added 10 ml. of glacial acetic acid, 1.0 g of cetyl trimethyl ammonium bromide and two to three drops of a crystal violet solution. Then, the mixture is titrated with 0.1N perchloric acid (solvent: glacial acetic acid). The end point of the titration is a point at which the blue-green of the mixture continues for about 1 minute. The calculation is made in accordance with the following equation.

$$\text{WPE(g/equiv.)} = \frac{1,000 \, W}{(V_s - V_b) \times N}$$

W: the weight in grams of the sample, $$\text{WPE(g/equiv.)} = \frac{1,000 \, W}{(V_a - V_b) \times N}$$

repeatedly to the following thermal shock cycle. The point at which a crack with a size of at least 1 mm occurs in the cured product is defined as the thermal shock resistance value.

| Repeated cycle | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Condition | no change | 25° C → 5° C | 5° C → 25° C | 25° C → −15° C | 15° C → 25° C | 25° C → −35° C | −35° C → 25° C | 25° C → −55° C | −55° C → 25° C | 25° C → 130° C | 130° C → −55° C | −55° C → 150° C | 150° C → 75° C | −75° C → 170° C |
| Time (min.) | — | 10 | 30 | 10 | 30 | 10 | 30 | 10 | 30 | 30 | 10 | 30 | 10 | 30 |
| Thermal shock resistance value | 0 | 1 | 2 | 3 | 4 | 5 | 6 | 7 | 8 | 9 | 10 | 11 | 12 | 13 |

$V_a$: the volume in milliliters of perchloric acid required for the titration of the sample,
$V_b$: the volume in milliliters of perchloric acid required for a blank test
N: the N value of the perchloric acid used

Heat distortion temperature

Measured in accordance with ASTM D-648-56

Thermal shock resistance

A hexagonal nut (½ W) is embedded in a disc-like cast cured product, and the cured product is subjected

Flexural strength and flexural modulus

Measured in accordance with ASTM D-790-66 using a test specimen with a length of 80 mm, a width of 10 mm and a thickness of 4 mm.

Tensile shear strength

Measured in accordance with ASTM D-1002-53T using two stainless steel sheets each with a length of 100 mm, a width of 25 mm and a thickness of 1.6 mm with the length of the bond portion adjusted to 12.5 mm.

Table 1

| | Run 1 | Run 2 | Run 3 | Run 4 | Run 5 | Run 6 | Run 7 | Run 8 |
|---|---|---|---|---|---|---|---|---|
| Formulation (*1) | | | | | | | | |
| (A) Polyepoxyde compounds; | | | | | | | | |
| Epikote 828 | 100 | 100 | 100 | 100 | 100 | 100 | 100 | |
| Epotherm 300 | | | | | | | | 100 |
| (B) Copolyester (*2) | | | | | | | | |
| B-1 | 5 | | | | | | | |
| B-2 | | 2.5 | 5 | 7.5 | | | | 5 |
| B-3 | | | | | 5 | | | |
| B-4 | | | | | | 5 | | |
| B-5 (*1) | | | | | | | 5 | |
| (B') Other additives instead of (B); | | | | | | | | |
| Polysulfone | | | | | | | | |
| Phonoxy | | | | | | | | |
| Noryl | | | | | | | | |
| Hycar CTBN | | | | | | | | |
| Bisphenol A | | | | | | | | |
| Properties of (A)+(B) or (B'); | | | | | | | | |
| viscosity at 30° C [poises] | 140 | 150 | 250 | 500 | 290 | — | 189 | 1000 |
| Epoxy equivalent[g/eq.] | 196 | 194 | 196 | 199 | 197 | 196 | 195 | 174 |
| Color | pale-yellow | " | " | " | " | " | " | " |
| Clarity (*1) | Yes | Cloudy | " | " | " | " | " | " |
| (C) Curing agents; HN-2200 (*1) | 85 | 85 | 85 | 85 | 85 | 85 | 85 | 71 |
| (D) Accelerator; BDMA | 0.5 | 0.5 | 0.5 | 0.5 | 0.5 | 0.5 | 0.5 | 1.0 |
| Physical properties of the cured products.; | | | | | | | | |
| Heat distortion temperature [° C] | 111 | 114 | 114 | 112 | 114 | 108 | 108 | 93 |
| Thermal shock resistance value | 4–5 | 5 | 10–12 | 12 | 10 | 10 | 8 | 10 |
| Flexural strength [kg/mm²] | — | 11.0 | 11.7 | — | 11.4 | — | 10.2 | — |
| Flexural modulus [kg/mm²] | — (*4) | 291 | 304 | — | 298 | — | 314 | — |
| Tensile shear strength [kg/cm²] | — | 80 | 82.0 | 84.1 | 80.1 | 90.0 | — | — |
| Color | yellow | " | " | " | " | " | " | " |
| Clarity | Yes | cloudy | " | " | " | " | " | " |
| | Control 1 | Control 2 | Control 3 | Control 4 | Control 5 | Control 6 | Control 7 | Control 8 |

Table 1-continued

| Formulation | (*1) | | | | | | | |
|---|---|---|---|---|---|---|---|---|
| (A) Polyepoxide compounds; | | | | | | | | |
| Epikote 828 | 100 | 100 | 100 | 100 | 100 | 100 | 100 | 100 |
| Epotherm 300 | | | | | | | | |
| (B) Copolyester (*2) | | | | | | | | |
| B-1 | | | | | | | | |
| B-2 | | 12 | | | | | | |
| B-3 | | | | | | | | |
| B-4 | | | | | | | | |
| B-5 | (*1) | | | | | | | |
| (B)'Other additives instead of (B); | | | | | | | | |
| Polysulfone | | | 5 | | | | | |
| Phenoxy | | | | 5 | | | | |
| Noryl | | | | | 5 | (*3) | | |
| Hycar CTBN | | | | | | 5 | 5 | 5 |
| Bisphenol A | | | | | | 24 | 24 | |
| Properties of (A)+(B) or (B'); | | | | | | | | |
| viscosity at 30° C [poises] | 75 | >1000 | 656 | 409 | | 286 | 317 | 66 |
| Epoxy equivalent[g/eq.] | 187 | 205 | 197 | 198 | not compatible | 248 | 254 | 197 |
| Color | Pale-yellow | " | " | " | | Pale yellow | " | " |
| Clarity | yes | Cloudy | " | yes | | cloudy | " | " |
| (*1) | | | | | | | | |
| (C) Curing agents; HN-2200 | 80 | 85 | 85 | 85 | | 85 | 85 | 85 |
| (*1) | | | | | | | | |
| (D) Accelerator; BDMA | 0.5 | 0.5 | 0.5 | 0.5 | | 0.5 | 0.5 | 0.5 |
| Physical properties of the cured products; | | | | | | | | |
| Heat distortion temperature [° C] | 114 | 109 | 104 | 118 | | 94 | 96 | 100 |
| Thermal shock resistance valve | 0–1 | 12 | 0–1 | 1–3 | | 10 | 12 | 5–7 |
| Flexural strength [Kg/mm²] | 8.8 | — | — | — | | 11.8 | — | 10.2 |
| Flexural modulus [Kg/mm²] | 273 | — | — | — | | 300 | — | 301 |
| (*4) | | | | | | | | |
| Tensile shear strength [kg/cm²] | 53 | — | 62.7 | 62.7 | | 33.1 | 30.1 | 30.9 |
| Color | yellow | " | " | " | | " | " | " |
| Clarity | yes | Cloudy | " | yes | | Cloudy | " | " |

(*1) See Table 2,
(*2) See Table 3,
(*3) See Table 2,
(*4) See Table 2, *5

Table 2

| (A) Polyepoxide compound (*1) | Epikote 828: | Trade name for liquid diglycidylether of bisphenol A, sold by Shell Chemical Co., Ltd. |
|---|---|---|
| | Epotherm 300: | Trade name for liquid alicyclic epoxy resin, sold by Mitsubishi Chemical Co., Ltd. |
| (B') Other Additives (*1) instead of (B) | Polysulfone: | Product of Union Carbide Co., Ltd. Grade No. P-1700 |
| | Phenoxy: | Product of Union Carbide Co., Ltd. Grade No. PAHJ |
| | Noryl: | Poly(phenylene ether) blended with polystyrene: product of General Electric Co., Ltd. Grade No. 731 |
| | Hycar CTBN: | Trade name for carboxy-terminated butadiene/acrylonitrile copolymer, sold by Goodrich Co., Ltd. Grade No. 1300 × 8 |
| (C) Curing agents (*1) | HN-2200: | Trade name for methyl tetrahydrophthalic anhydride, sold by Hitach Chemical Co., Ltd. |
| (D) Accelerator (*1) | BDMA: | Benzyl dimethylamine |
| (*3) | | Product prepared from 100 parts of aforesaid Hycar CTBN, 300 parts by bisphenol A and 0.5 parts of p-toluenesulfonic acid according to Example 6 of Japanese Laid-Open Patent Publication Nos. 69897/1973. |
| (*4) | | 35 parts of an amine type curing agent of the following composition instead of (C) curing agent and (B) accelerator. |
| | | Lithium chloride      5 parts |
| | | N-amino-piperazine    35 parts |
| | | m-cresol                30 parts |

Table 2-continued

| | |
|---|---|
| diethylene triamine | 30 parts |

Table 3

| No. | Materials for synthesis (parts by weight) *6 | | | $\frac{x}{x+y}$ | Molecular weight (inherent viscosity *8 |
|---|---|---|---|---|---|
| | Aromatic dicarboxylic acid | Short-chain glycol | Long-chain (alkylene oxide) glycol | | |
| B-1 | Dimethyl terephthalate (30.0) | 1,4-butanediol (36.5) | Poly(ethylene oxide) glycol (38.5) [Mn=1.000](*7) | 0.58 | 1.00 |
| B-2 | Dimethyl terephthalate (30.0) | 1,4-butanediol (17.3) | Poly(tetramethylene oxide) glycol (173) [Mn=1.000](*7) | 0.49 | 1.44 |
| B-3 | Dimethyl terephthalate (44.6) | 1,4-butanediol (58.4) | Poly(ethylene oxide) glycol (56.2) [Mn=4.000](*7) | 0.45 | 1.22 |
| B-4 | Dimethyl isophthalate (38.5) | Cyclohexane dimethanol (37.4) | Poly(tetramethylene oxide) glycol (24.7) [Mn=1.000](*7) | 0.56 | 0.85 |
| B-5 | Dimethyl terephthalate (46.9) | Ethylene glycol (31.9) | Poly(tetramethylene oxide) glycol (56.9) [Mn=1.000](*7) | 0.38 | 1.10 |

*6: A catalyst and an antioxidant were further added, and the copolyester was prepared in accordance with the method of Belgian Patent 779,683.
*7: Number average molecular weight
*8: Measured in a 7:3 mixture of phenol and 1,1,2,2-tetrachloroethane at 30° C. in a concentration of 0.5%.

The following conclusions can be drawn from the above tables. When the aromatic copolyester (B) is added to the polyepoxide compound in accordance with the present invention, the thermal shock resistance of the resulting composition can be greatly improved over the conventional polyepoxide compound not containing the aromatic copolyester without an incidental deterioration in physical properties such as heat distortion temperature. No great difference in the properties of the cured products is seen according to the types or amounts of the aromatic dicarboxylic acid, short-chain glycol and poly(alkylene oxide) glycol which make up the aromatic copolyester. On the other hand, similar effects are observed in the properties of the cured products when a typical aromatic polyepoxide compound, Epikote 828 (trademark for a diglycidyl ether of bisphenol A, a product of Shell Chemical), and a typical alicyclic polyepoxide compound, Epotherm 300 (trademark for a diglycidyl ester of an alicyclic dicarboxylic acid, a product of Mitsubishi Chemical Co., Ltd.), are used.

A study of the effect of the amount of the aromatic copolyester (B) on the polyepoxide compound (A-1) shows that when the amount is too small, there is a decline in thermal shock resistance value, and when it is too large, the viscosity of the mixture increases remarkably to cause disadvantage in working the resulting composition. However, according to the present invention, the thermal shock resistance can be markedly improved without involving a marked increase in the viscosity of the compositions of this invention or a decrease in the heat distortion temperature of the cured product.

A further advantage of the compositions of this invention is that their tensile shear strength which a measure of the adhesive property of the cured product increases over the conventional compositions.

Controls 3 to 8

Table 1 also shows the results of examples in which thermoplastic resins (Controls 3, 4 and 5) or elastomers (Controls 6, 7 and 8) were added instead of the copolyester. In these Controls, the experimental conditions were the same as those in Example 1.

Experiments separately performed by the inventors of the present application show the following. Even when polysulfone (Control 3) or phenoxy resin (Control 4) is added as a thermoplastic resin to the polyepoxy compound, the thermal shock resistance of the resulting compositions can hardly be improved. Furthermore, even when Noryl (Control 5) is added, it does not become compatible with the polyepoxide compound, and phase separation occurs. On the other hand, when Hycar CTBN (Controls 6, 7 and 8) is added instead of the thermoplastic resin, the thermal shock resistance of the cured product can be markedly improved, but its heat distortion temperature is lowered drastically. Furthermore, the control compositions have tensile shear strength far lower than the compositions of this invention.

EXAMPLE 2

1. Unsaturated polyesters A-1 to A-3 were prepared as follows:

Unsaturated Polyester A-1

A glass reaction vessel equipped with a stirrer, a nitrogen introducing inlet, a condenser and a thermometer was charged with 2.0 moles of maleic anhydride, 2.5 moles of phthalic anhydride and 4.8 moles of ethylene glycol, and the mixture was reacted to a stream of nitrogen at 200° C. for 8 hours. When the acid value of the reaction mixture became 40, the temperature was lowered to 140° to 160° C., and 80 ppm of methyl hydroquinone was added to form an unsaturated polyester (A-1).

Unsaturated polyester A-2

The same reactor was charged with 2.5 moles of isophthalic acid, and 5.5 moles of propylene glycol, and they were reacted at 185° C. for 1.5 hours, at 190° C. for 2.5 hours, at 195° C. for 2.0 hours, and at 205° C. for 1 hour. When the acid value of the reaction mixture became less than 5, maleic anhydride (2.5 moles) was added and reacted at 185° C. for 2 hours, at 200° C. for 2 hours, and at 215° C. for 2 hours. When the acid value of the reaction mixture reached 40, the temperature was lowered to 140° to 160° C., and 80 ppm of methyl hydroquinone was added to afford an unsaturated polyester (A-2).

Unsaturated polyester A-3

A glass reaction vessel equipped with a stirrer, a nitrogen introducing inlet tube, a condenser and a thremometer was charged with 5.5 moles of maleic anhydride, 5.0 moles of 2,2'-di(4-hydroxy-propoxy phenyl) propane and 500 ppm of hydroquinone. The mixture was maintained at 160° C. for 4 hours in a stream of nitrogen, and then reacted at 200° C. for 4 hours. There was obtained an unsaturated polyester (A-3) having an acid value of 54.

2. A 0.5-liter flask equipped with a stirrer, a thermometer and a nitrogen-introducing inlet was charged with 60 parts of the unsaturated polyester (A-1), and with or without the addition of 3 parts each of the aromatic copolyester B-1 or the aromatic copolyester B-2 used in Example 1, the material was heated at 200° to 210° C. for 1 to 2 hours in a stream of nitrogen. Then, the temperature was lowered to 80° to 100° C., and 40 parts of styrene was added to form a solution of a unsaturated polyester resin composition.

To 100 parts of this solution were added 1.0 part of methyl ethyl ketone peroxide as a curing agent, and 0.5 part of cobalt naphthenate as a promotor. The mixture was allowed to stand at room temperature for 24 hours, and then heated at 120° C. for 4 hours to cure the composition.

The properties of the resulting cured product are shown in Table 4.

The heat distortion temperature and the thermal shock resistance were measured in the same way as in Example 1, and the other properties were determined in the following manner.

Impact strength (unnotched Izod)

Measured in accordance with ASTM D-256-56

Flexural strength and flexural modulus

Measured in accordance with ASTM D790-66 using a test specimen with a length of 80 mm, a width of 25 mm and a thickness of 3 mm with the distance between fulcra being adjusted to 50 mm.

The stress of the cured products of Run 2 and Control 9 was measured by means of a photoelastic meter, and the results are shown in Photographs 3 (Run 2) and 4 (Control 9).

Table 4

|  | Run 1 | Run 2 | Control 9 |
|---|---|---|---|
| Formulation |  |  |  |
| Unsaturated polyester A-1 | 60 | 60 | 60 |
| Styrene | 40 | 40 | 40 |
| Aromatic Copolyester |  |  |  |
| B-1 | 3 | — | — |
| B-2 | — | 3 | — |
| Physical properties of the cured product |  |  |  |
| Heat distortion temperature (° C) | 67 | 67 | 67 |
| Thermal shock resistance value | 6 | 11 | 0 |
| Impact strength |  |  |  |
| Unnotched Izod(Kg.cm/cm$^2$) | 6.5 | 15.3 | 3.0 |
| Flexural strength(Kg/mm$^2$) | 15.3 | 14.5 | 9.9 |
| Flexural modulus (kg/mm$^2$) | 370 | 365 | 349 |

EXAMPLE 3

This Example shows the effect of the amount of the aromatic copolyester.

As is clear from Table 5, when the amount of the aromatic copolyester is descreased, the impact strength and flexural strength of the cured product are reduced. On the other hand, when the amount of the aromatic copolyester is increased, the impact strength and flexural strength of the cured product are similiarly reduced. However, in the case of the cured products of the compositions of this invention, their thermal shock resistance, impact resistance and flexural strength can be greatly improved without lowering their heat distortion temperature.

Table 5

|  | Run 1 | Run 2 | Run 3 | Run 4 | Run 5 | Control 10 | Control 11 | Control 12 | Control 13 |
|---|---|---|---|---|---|---|---|---|---|
| Formulation |  |  |  |  |  |  |  |  |  |
| Unsaturated polyester A-1$^1$ | 60 | 60 | 55 | 50 | 50 | 55 | 50 | 60 | 50 |
| Styrene | 40 | 40 | 45 | 50 | 50 | 45 | 50 | 40 | 50 |
| Copolyester B-2$^2$ | 3 | 1 | 10 | 20 | 30 | — | — | 0.5 | 40 |
| Physical properties of the cured product |  |  |  |  |  |  |  |  |  |
| Heat distortion temperature (° C) | 67 | 67 | 67 | 67 | 67 | 68 | 68 | 67 | 67 |
| Thermal shock resistance value | 11 | 11 | 11 | 11 | 11 | 0 | 0 | 11 | 11 |
| Impact strength unnotched Izod (kg.cm/cm$^2$) | 15.3 | 6.0 | 10.2 | 10.0 | 8.5 | 4.1 | 2.5 | 3.5 | 3.3 |
| Flexural Strength (kg/mm$^2$) | 14.5 | 10.2 | 13.6 | 12.4 | 10.6 | 9.6 | 9.4 | 8.2 | 8.0 |
| Flexural modulus (Kg/mm$^2$) | 365 | 350 | 363 | 365 | 356 | 345 | 342 | 346 | 340 |

EXAMPLE 4

This Example shows the effect of the type of the aromatic copolyester or the unsaturated polyester.

In this Example, the same aromatic copolyesters as used in Example 1 were used. As is clear from Table 6, even the composition of the copolyester is changed, or even when the molecular weight of the long-chain poly-(alkylene oxide) glycol is changed, no great difference is brought about in the properties of the cured products of the resin compositions of this invention. Furthermore, even when the type of the unsaturated polyester is changed, no great difference is brought about in the properties of the cured products of the resin compositions of this invention.

maleic anhydride and 0.0087 part of methyl hydroquinone. The mixture was maintained at 160° C. in an atmosphere of nitrogen, and then reacted at 200° C. for 5 hours. When the acid value of the reaction mixture became 18.0, the temperature was lowered to 140° to 160° C., and with stirring, the reaction mixture was poured into 111 parts of a styrene solution containing 0.32 part of methylhydroquinone (dibutyl phthalate) solution. There was obtained an unsaturated resin solution (A-4).

The unsaturated polyester resin solution obtained was cured in the same way as in Example 2. The results are shown in Table 7.

3. Experimental conditions of Control 20

100 parts of polybutadiene glycol (molecular weight 2000, 1,2-vinyl cone content 90%, 1,4-trans content 10%), 10 parts of methyl methacrylate and 0.5 parts of tetra-n-butyl titanate were well mixed and reacted at 120° C. for 5 hours. Then, 0.03 part of hydroquinone and 110 parts of styrene were added to form an unsaturated polyester resin solution (A-5).

To 100 parts of the resulting resin solution, were added 0.5 part of benzoyl peroxide and 0.2 part of cobalt naphthenate, and the mixture was heated at 80° C. for 5 hours, and at 120° C. for 10 hours to cure it. The results are shown in Table 7.

Table 6

|  | Run 1 | Run 2 | Run 3 | Run 4 | Run 5 | Control 14 | Control 15 |
|---|---|---|---|---|---|---|---|
| Formulation |  |  |  |  |  |  |  |
| Unsaturated polyester |  |  |  |  |  |  |  |
| A-1 | 60 | 60 | 60 |  |  |  |  |
| A-2 |  |  |  | 60 |  | 60 |  |
| A-3 |  |  |  |  | 60 |  | 60 |
| Sytene | 40 | 40 | 40 | 40 | 40 | 40 | 40 |
| Aromatic Copolyester |  |  |  |  |  |  |  |
| B-2 |  |  |  | 3 | 3 | — | — |
| B-3 | 3 |  |  |  |  | — | — |
| B-4 |  | 3 |  |  |  | — | — |
| B-5 |  |  | 3 |  |  | — | — |
| Physical properties of the cured product |  |  |  |  |  |  |  |
| Heat distortion temperature (° C) | 67 | 78 | 80 | 114 | 80 | 116 |  |
| Thermol schock resistance value | 11 | 14 | 5 | 3 | 1 | 0 |  |
| Impart strength Unnotched Izod (kg.cm/cm$^2$) | 5.6 | 7.5 | 9.3 | 5.3 | 3.0 | 3.8 |  |
| Flexural strength (kg./mm$^2$) | 10.0 | 10.6 | 10.2 | 10.9 | 10.3 | 11.3 |  |
| Flexural modulus (kg/mm$^2$) | 342 | 351 | 299 | 310 | 298 | 306 |  |

Controls 16 to 20

1. For comparison, polybutadiene (1,2-vinyl content 70%, average molecular weight 250,000; Control 16), powdery acrylonitrile/butadiene copolymer (acrylonitrlile content 41%, average molecular weight 200,000 Control 17), styrene/butadiene/styrene block copolymer (having an average molecular weight of 20,000/60,000/20,000, respectively; Control 18), and unsaturated polyesters of difference different compositions (Controls 19 and 20) were used respectively instead of the aromatic copolyester.

The experimental conditions in Controls 16, 17 and 18 were the same as those in Example 2. The experimental conditions in Controls 19 and 20 were as follows:

2. Experimental conditions of Control 19

A glass reaction vessel equipped with a stirrer, a nitrogen introducing tube, a condenser and a thermometer was charged with 31.2 parts of propylene glycol, 232.2 parts of a diethylene glycol terephthalate oligomer (average molecular weight 1750), 36.6 parts of Table 7

|  | Control 16 | Control 17 | Control 18 | Control 19 | Control 20 |
|---|---|---|---|---|---|
| Formulation |  |  |  |  |  |
| Unsaturated polyester |  |  |  |  |  |
| A-1 | 60 | 60 | 60 |  |  |
| A-4 |  |  |  | 70 |  |
| A-5 |  |  |  |  | 50 |
| Styrene 40 | 40 | 40 | 30 | 50 | 50 |
| Additives |  |  |  |  |  |
| Polybutadiene | 3 |  |  |  |  |
| Hycar 1411 |  | 3 |  |  |  |
| Styrene-butadiene-styrene block copolymer |  |  | 3 |  |  |
| Physical properties of the cured product |  |  |  |  |  |
| Heat distortion temperature (° C) | 72 | 57 | 56 | <room temp. | <room temp. |
| Thermal schock resistance value | 10 | 5 | 3 | 5 | 7 |
| Impact strength Unnotched Izod (kg.cm/cm$^2$) | 3.6 | 8.4 | 3.5 | No | 2.5 |

Table 7-continued

|  | Control 16 | Control 17 | Control 18 | Control 19 | Control 20 |
|---|---|---|---|---|---|
|  |  |  |  | Break |  |
| Flexural strength (kg/mm$^2$) |  | 5.2 | 8.2 | 8.0 |  |
| Flexural modulus (kg/mm$^2$) |  | 278 | 281 | 305 |  |

Controls 16 to 20 shown in Table 7 are typical examples of the prior technique of improving the thermal shock resistance and impact strength of cured products of unsaturated polyester resins.

As is clear from Table 7, when the powdery acrylonitrile/butadiene copolymer (Control 17) or styrene/-butadiene/styrene block copolymer (Control 18) is added, the thermal shock resistance of the cured product increases, but its heat distortion temperature is lowered remarkably. On the other hand, when polybutadiene (Control 16) is added, the thermal shock resistance and heat distortion temperature can be greatly improved, but there is a marked reduction in flexural strength and flexural modulus. Furthermore, the impact strength is reduced greatly as compared with the composition of the present invention.

When the composition of the unsaturated polyester is changed as in Controls 19 and 20, the resulting cured product shows a marked decrease in heat distortion temperature.

Thus, it is apparent that the unsaturated polyester resin compositions of this invention give cured products having superior thermal shock resistance, high impact stength, high flexural strength and high heat distortion temperature as compared with any of the conventional unsaturated polyester resin compositions.

What we claim is:

1. A curable epoxy resin composition comprising
  a. a polyepoxide compound containing at least two 1,2-epoxy groups per molecule,
  b. 1 to 10% by weight, based on the polyepoxide compound (A) of an aromatic copolyester having a weight average molecular weight of 10,000 to 100,000 and composed of recurring units of formula (I) and recurring units of formula (II)

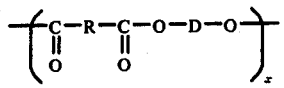 (I)

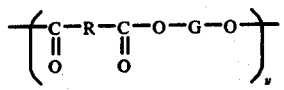 (II)

wherein R is a residue resulting from the removal of carboxyl groups from an aromatic dicarboxylic acid; D is a residue resulting from the removal of hydroxyl groups from a glycol containing 2 to 15 carbon atoms; G is a residue resulting from the removal of the terminal hydroxyl group from a long-chain poly(alkylene oxide) glycol having a number average molecular weight of 350 to 6,000; and $x/x + y$ is from 0.2 to 0.8,
  c. a curing agent for the polyepoxide compound (A).

2. The curable resin composition according to claim 1 wherein said polyepoxide compound is selected from the group consisting of
  1-a. polyepoxy ethers containing at least two epoxy groups per molecule,
  1-b. polyepoxy esters containing at least two epoxy groups per molecule, and
  1-c. polyepoxide compounds containing at least two epoxy groups per molecule, prepared by epoxidizing compounds containing at least two unsaturated bonds.

3. The curable resin composition according to claim 1 wherein said curing agent (C) is selected from the group consisting of
  2-a. polycarboxylic acids containing at least two carboxyl groups per molecule,
  2-b. carboxylic acid anhydrides containing at least one carboxylic anhydride group per molecule,
  2-c. polyamines containing at least one primary, secondary or tertiary amino group per molecule,
  2-d. polythiols containing at least two thiol groups per molecule, and
  2-e. a polyamide resin.

4. The resin composition according to claim 1 wherein D in formula (I) is a residue resulting from the removal of two hydroxyl groups from a glycol containing 2 to 8 carbons.

5. The resin composition according to claim 1 wherein G in formula (II) is a residue resulting from the removal of the two terminal hydroxyl groups from a long-chain poly(alkylene oxide) glycol having a number average molecular weight of 800 to 5,000.

6. The resin composition according to claim 1 claims 1 to 6 wherein at least 70 mole% of the total R groups contained in the entire recurring units of formula (I) and formula (II) are para-phenylene groups.

7. The resin composition according to claim 1 which further contains (D) a curing promotor selected from the group consisting of
  3-a. secondary and tertiary aliphatic amines,
  3-b. metal salts of organic acids,
  3-c. metal halides, and
  3-d. Lewis acids and complexes thereof.

8. The resin composition according to claim 1 wherein $x$ and $y$ in formulae (I) and (II) representing the recurring units of the copolyester (B) has the following relation $$x/x + y = 0.35 - 0.70.$$

9. The resin composition according to claim 1 which further contains a reactive or non-reactive diluent.

* * * * *